United States Patent
Fujii et al.

(10) Patent No.: US 10,008,337 B2
(45) Date of Patent: Jun. 26, 2018

(54) ACTIVATED CARBON FOR AN ELECTRIC DOUBLE-LAYER CAPACITOR ELECTRODE AND MANUFACTURING METHOD FOR SAME

(71) Applicant: POWER CARBON TECHNOLOGY CO., LTD., Gumi (KR)

(72) Inventors: Masaki Fujii, Tokyo (JP); Masatoshi Nishida, Tokyo (JP); Keizou Ikai, Tokyo (JP)

(73) Assignee: POWER CARBON TECHNOLOGY CO., LTD. (KR)

( * ) Notice: Subject to any disclaimer, the term of this patent is extended or adjusted under 35 U.S.C. 154(b) by 0 days. days.

(21) Appl. No.: 14/773,189

(22) PCT Filed: Mar. 7, 2014

(86) PCT No.: PCT/JP2014/055955
§ 371 (c)(1),
(2) Date: Sep. 4, 2015

(87) PCT Pub. No.: WO2014/136936
PCT Pub. Date: Sep. 12, 2014

(65) Prior Publication Data
US 2016/0012980 A1 Jan. 14, 2016

(30) Foreign Application Priority Data

Mar. 7, 2013 (JP) .................. 2013-045143

(51) Int. Cl.
*C01B 32/10* (2017.01)
*H01G 11/34* (2013.01)
(Continued)

(52) U.S. Cl.
CPC .............. *H01G 11/34* (2013.01); *B01J 20/20* (2013.01); *B01J 20/28066* (2013.01);
(Continued)

(58) Field of Classification Search
CPC ........ H01G 11/34; H01G 11/44; H01G 11/86; B01J 20/28066; B01J 20/3021;
(Continued)

(56) References Cited

U.S. PATENT DOCUMENTS

| 7,785,543 | B2 * | 8/2010 | Kume | .................. B01D 53/46 422/168 |
| 2002/0048144 | A1 | 4/2002 | Sugo et al. | |
| 2010/0074831 | A1 * | 3/2010 | Yoshinaga | ............... B01J 20/20 423/445 R |

FOREIGN PATENT DOCUMENTS

| JP | 54-104499 | 8/1979 |
| JP | 2002-104817 A | 4/2002 |

(Continued)

OTHER PUBLICATIONS

English machine translation of JP2011-079705A.*
(Continued)

*Primary Examiner* — Richard M Rump
(74) *Attorney, Agent, or Firm* — Faegre Baker Daniels LLP

(57) ABSTRACT

There are disclosed activated carbon for use in an electric double-layer capacitor electrode, the carbon being capable of improving rate characteristics and float characteristics of the electric double-layer capacitor electrode, and a method for manufacturing the activated carbon. The method for manufacturing the activated carbon for use in the electric double-layer capacitor electrode, comprising the steps of: grinding a carbon raw material to adjust an average particle diameter of the carbon raw material into a range of 1 μm to 15 μm; mixing the carbon raw material whose average particle diameter has been adjusted, with an alkali activator to obtain a mixture; and an activation treatment comprising (Continued)

heating the mixture under an atmosphere of an inert gas and then under an atmosphere of a mixed gas of the inert gas and water vapor.

2 Claims, 5 Drawing Sheets

(51) Int. Cl.
*C01B 31/10* (2006.01)
*H01G 11/86* (2013.01)
*B01J 20/20* (2006.01)
*B01J 20/28* (2006.01)
*B01J 20/30* (2006.01)
*H01G 11/44* (2013.01)

(52) U.S. Cl.
CPC ....... *B01J 20/3021* (2013.01); *B01J 20/3078* (2013.01); *C01B 31/10* (2013.01); *H01G 11/44* (2013.01); *H01G 11/86* (2013.01); *Y02E 60/13* (2013.01)

(58) Field of Classification Search
CPC ....... B01J 20/3078; B01J 20/20; C01B 31/10; C01B 31/08; C01B 31/086; C01B 31/089; Y02E 60/13
See application file for complete search history.

(56) References Cited

FOREIGN PATENT DOCUMENTS

| JP | 2003-282369 A | 10/2003 |
|---|---|---|
| JP | 2005-001967 A | 1/2005 |
| JP | 2007-281346 A | 10/2007 |
| JP | 4313547 B2 | 8/2009 |
| JP | 2010-105836 A | 5/2010 |
| JP | 2011-020907 A | 2/2011 |
| JP | 2011-046584 A | 3/2011 |
| JP | 2011-079705 A | 4/2011 |
| JP | 2012-188309 A | 10/2012 |

OTHER PUBLICATIONS

Teng, Hsisheng, and Sheng-Chi Wang. "Preparation of porous carbons from phenol—formaldehyde resins with chemical and physical activation." Carbon 38.6 (2000): 817-824.*

Lu, Chunlan, Shaoping Xu, and Changhou Liu. "The role of K2CO3 during the chemical activation of petroleum coke with KOH." Journal of Analytical and Applied Pyrolysis 87.2 (2010): 282-287.*

Zhang, Huaihao, Jinfu Chen, and Shaohui Guo. "Preparation of natural gas adsorbents from high-sulfur petroleum coke." Fuel 87.3 (2008): 304-311.*

Shimamoto, et al., "Electric Double Layer Capacitor for Automotive Applications", Panasonic Technical Journal, vol. 55, No. 2, p. 55, 2009.

Matsuwaki, "Activated Carbon for Electrochemical Double Layer Capacitor (EDLC)", JETI, vol. 59, No. 7, p. 38, 2011, with partial translation.

International Preliminary Report on Patentability, Chapter I, for Application No. PCT/JP2014/055955 dated Sep. 8, 2015.

Chinese Office Action for Application No. 201480012690.0 dated May 18, 2017.

* cited by examiner

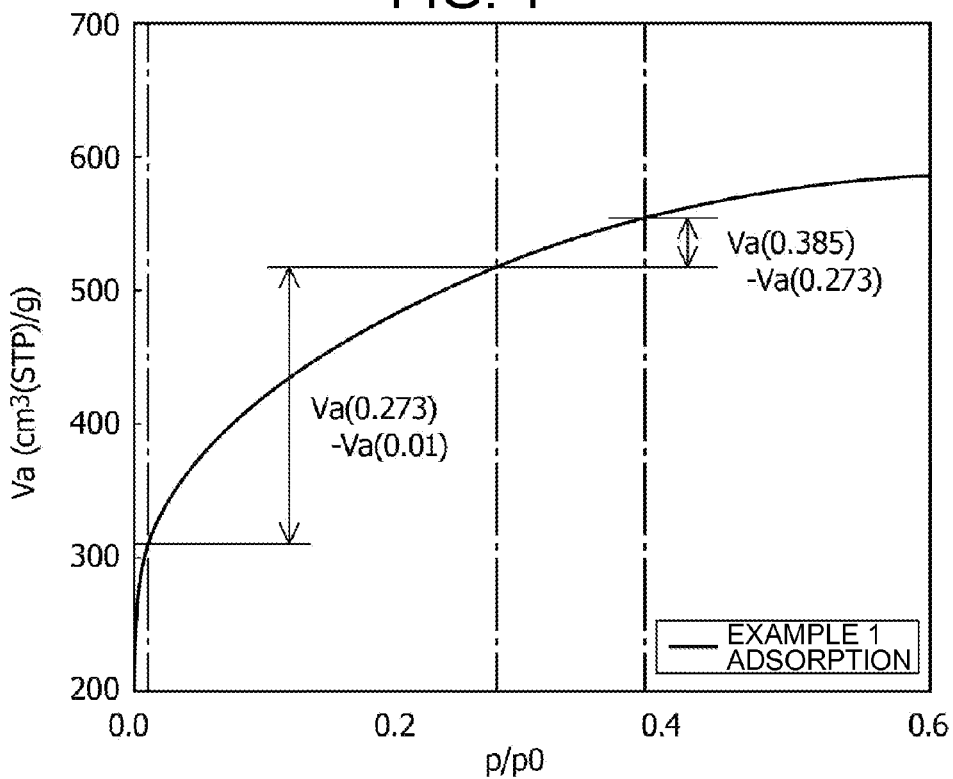
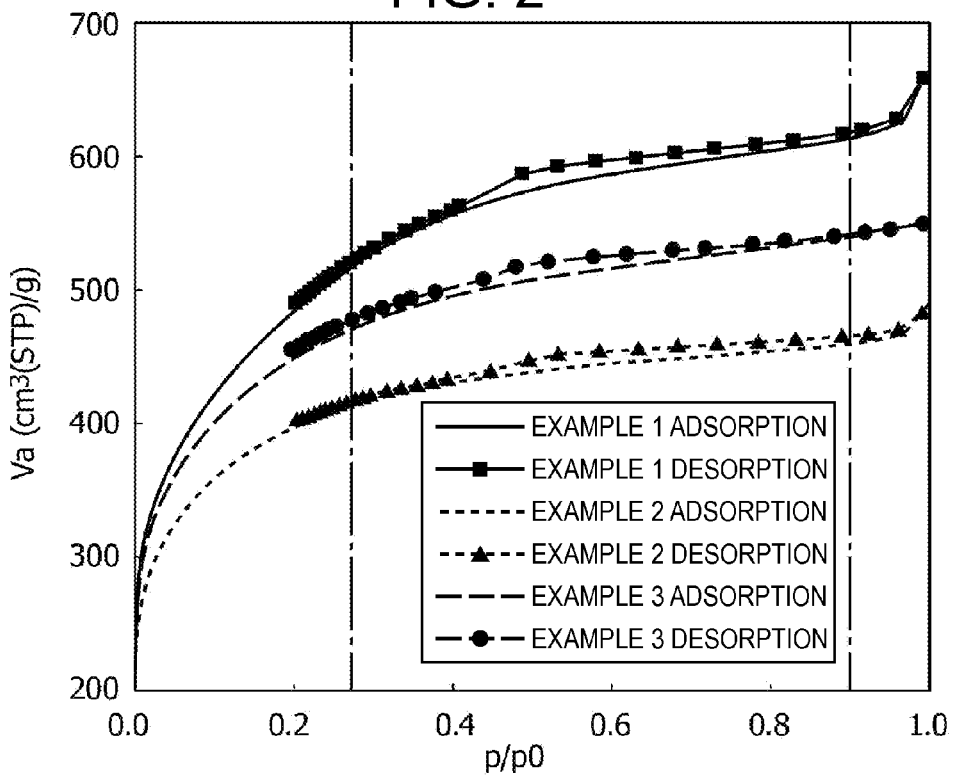

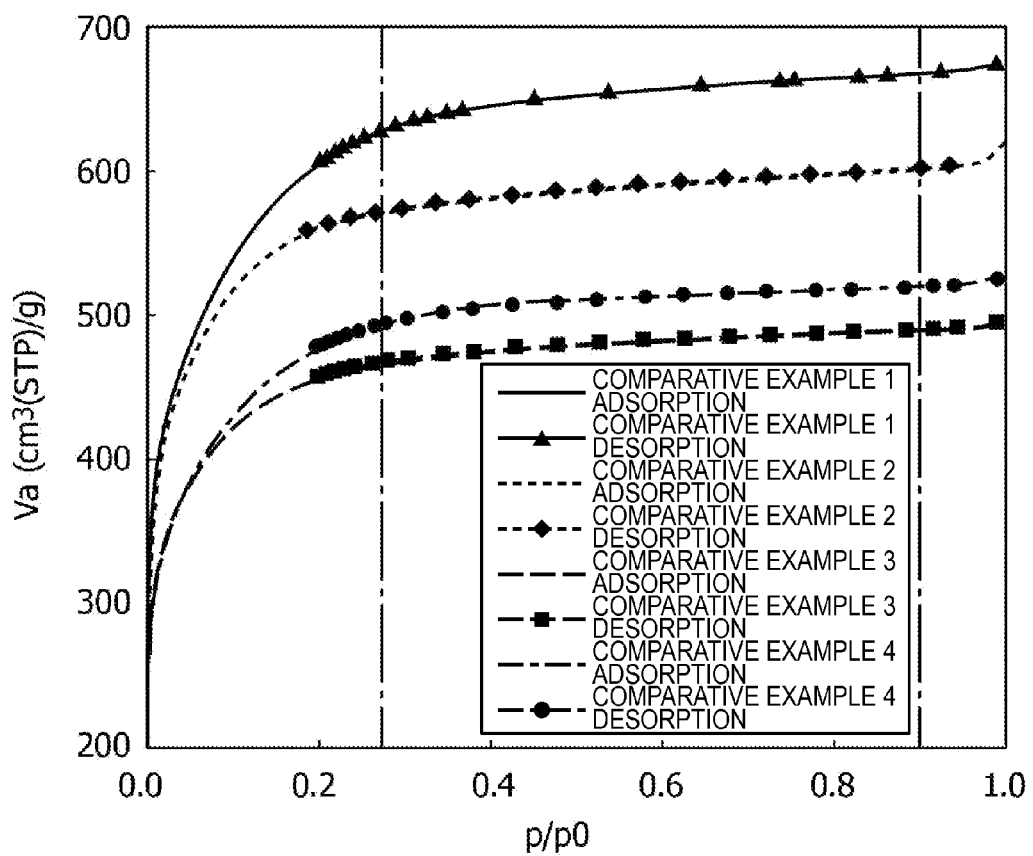

ACTIVATED CARBON FOR AN ELECTRIC DOUBLE-LAYER CAPACITOR ELECTRODE AND MANUFACTURING METHOD FOR SAME

CROSS REFERENCE TO RELATED APPLICATIONS

The present application is a national phase entry under 35 U.S.C. § 371 of International Application No. PCT/JP2014/055955, filed Mar. 7, 2014, which claims priority to Japanese Patent Application No. 2013-045143, filed Mar. 7, 2013, the entire contents of which are hereby incorporated herein by reference.

TECHNICAL FIELD

The present invention relates to activated carbon for an electric double-layer capacitor electrode, and a method for manufacturing the activated carbon.

BACKGROUND ART

An electric double-layer capacitor has a structure in which a pair of polarizable electrodes made of activated carbon are disposed as a positive electrode and a negative electrode to face each other via a separator. Each polarizable electrode is impregnated with a solution of water-soluble electrolyte or a solution of electrolyte in non-aqueous solvent, and the each polarizable electrode comes in contact with collecting electrodes, respectively.

Improvements of performances such as resistance, low temperature characteristics and life among characteristics of the electric double-layer capacitor are noticeably influenced by pore diameters of the activated carbon for use as each polarizable electrode. It is considered that, as pores of the activated carbon, the mesoporous of larger than 2 nm but 20 nm or less play a more important role than the microporous of 2 nm or less (e.g., Non-Patent Documents 1 and 2). Concerning pore diameters or pore volumes of the activated carbon, a large number of patent applications have been filed (e.g., Patent Documents 1 to 7). In addition, it is considered that a capacitance of the electric double-layer capacitor is substantially proportional to surface area of each polarizable electrode, and the activated carbon having a large specific surface area is usually used as a carbon material for the electric double-layer capacitor (Patent Document 1).

The activated carbon is usually produced by carbonizing a carbonaceous material at a temperature of 800° C. or less and then subjecting the carbonized material to an activation treatment. Here, the activation treatment includes, for example, a method of heating the carbonized material at 600° C. to 1000° C. in an atmosphere of water vapor, carbon dioxide or the like; and a method of mixing the carbonized material with zinc chloride, potassium hydroxide and the like and heating the mixture in an inactive atmosphere. In this activation process, a large number of pores suitable for adsorption are generated in the surface of the carbon material produced in the carbonization step. Further, the polarizable electrodes are prepared by a method comprising the steps of adding a conductive agent and a bonding agent to the activated carbon and subjecting the mixture to kneading and rolling; a method comprising the steps of: mixing the activated carbon with non-activated resins and sintering the mixture; or the like.

PRIOR ART DOCUMENTS

Patent Documents

Patent Document 1: JP 2003-282369A
Patent Document 2: Japanese Patent No. 4313547
Patent Document 3: JP 2007-281346A
Patent Document 4: JP 2010-105836A
Patent Document 5: JP 2011-020907A
Patent Document 6: JP 2012-188309A
Patent Document 7: JP 2011-46584A Non-Patent Documents Non-Patent Document 1: Shimamoto, Yamada, Panasonic Technical Journal, Vol. 55, No. 2, p. 55 (2009)
Non-Patent Document 2: Matsuwaki, JETI, Vol. 59, No. 7, p. 38 (2011)

SUMMARY OF THE INVENTION

Problem to be Solved by the Invention

In recent years, there has been demanded activated carbon which is capable of providing an electric double-layer capacitor having high rate characteristics and float characteristics, in an application of an electrode material for the electric double-layer capacitor. An object of the present invention is to provide activated carbon for an electric double-layer capacitor electrode which is capable of improving the rate and float characteristics of the electric double-layer capacitor electrode, and a method for manufacturing the activated carbon.

Solution to the Problem

The present inventors have performed various investigations, and have paid attention to, as physical properties of activated carbon for an electric double-layer capacitor electrode, not only to a size of a specific surface area but also to a nitrogen gas adsorption isotherm obtained by nitrogen gas adsorption measurement and a nitrogen gas desorption isotherm obtained by nitrogen gas desorption measurement at a liquid nitrogen temperature. As a result, it has been found that, when a ratio of nitrogen gas adsorption amounts, an area value of hysteresis generated by a difference between the nitrogen gas adsorption isotherm and the nitrogen gas desorption isotherm and the specific surface area are within predetermined numerical ranges, excellent characteristics as a carbon material for the electric double-layer capacitor electrode can be obtained. In addition, it has been found that, with respect to an alkali activation treatment in an inert atmosphere, such a carbon material can be manufactured by comprising a stage of performing the activation treatment under an atmosphere of a mixed gas of an inert gas and water vapor, and the present invention has been completed.

In a first aspect according to the present invention, provided is a method for producing activated carbon for an electric double-layer capacitor electrode comprising the steps of: grinding a carbon raw material to adjust an average particle diameter of the carbon raw material into a range of 1 μm to 15 μm; mixing the carbon raw material whose average particle diameter has been adjusted, with an alkali activator to obtain a mixture; and an activation treatment comprising heating the mixture under an atmosphere of an inert gas and then under an atmosphere of a mixed gas of the inert gas and water vapor.

In a second aspect according to the present invention, provided is activated carbon for an electric double-layer capacitor electrode comprising: a ratio α of adsorption amounts in a range of 0.10≤α≤0.22, in a nitrogen gas adsorption isotherm obtained by nitrogen gas adsorption at a liquid nitrogen temperature, the ratio α being represented by the following equation (1), wherein Va (0.01) represents a nitrogen gas adsorption amount at a relative pressure (p/p$_0$) of 0.01, Va (0.273) represents a nitrogen gas adsorption amount at a relative pressure (p/p$_0$) of 0.273, and Va (0.385) represents a nitrogen gas adsorption amount at a relative pressure (p/p$_0$) of 0.385, wherein p represents an adsorption equilibrium pressure and p$_0$ represents a saturated vapor pressure; an area of adsorption/desorption hysteresis in a range of 1.5 cm$^3$ (STP)/g≤β≤5.0 cm$^3$ (STP)/g, where STP means standard temperature and pressure, and wherein the area is obtained by a difference between the adsorption amount indicated by a nitrogen gas adsorption isotherm and a desorption amount indicated by a nitrogen gas desorption isotherm in a range of 0.273≤p/p$_0$≤0.900; and a specific surface area by a BET method of from 1500 m$^2$/g to 2300 m$^2$/g.

[Equation (1)]

$$\alpha=(Va(0.385)-Va(0.273))/(Va(0.273)-Va(0.01)) \quad (1)$$

Advantageous Effect of the Invention

According to the present invention, activated carbon having specific adsorption/desorption characteristics of a nitrogen gas can be obtained, and an electric double-layer capacitor electrode comprising the activated carbon can be provided for the excellent rate characteristics and float characteristics.

BRIEF DESCRIPTION OF THE DRAWINGS

FIG. 1 shows an adsorption isotherm curve prepared by measuring for the activated carbon of Example 1-1.

FIG. 2 shows adsorption isotherms and desorption isotherms curves prepared by measuring for the activated carbons of Example 1-1 to Example 3-1.

FIG. 3 shows adsorption isotherms and desorption isotherms curves prepared by measuring for the activated carbons of Comparative Example 1-1 to Comparative Example 4-1.

MODE FOR CARRYING OUT THE INVENTION

Figure 4:
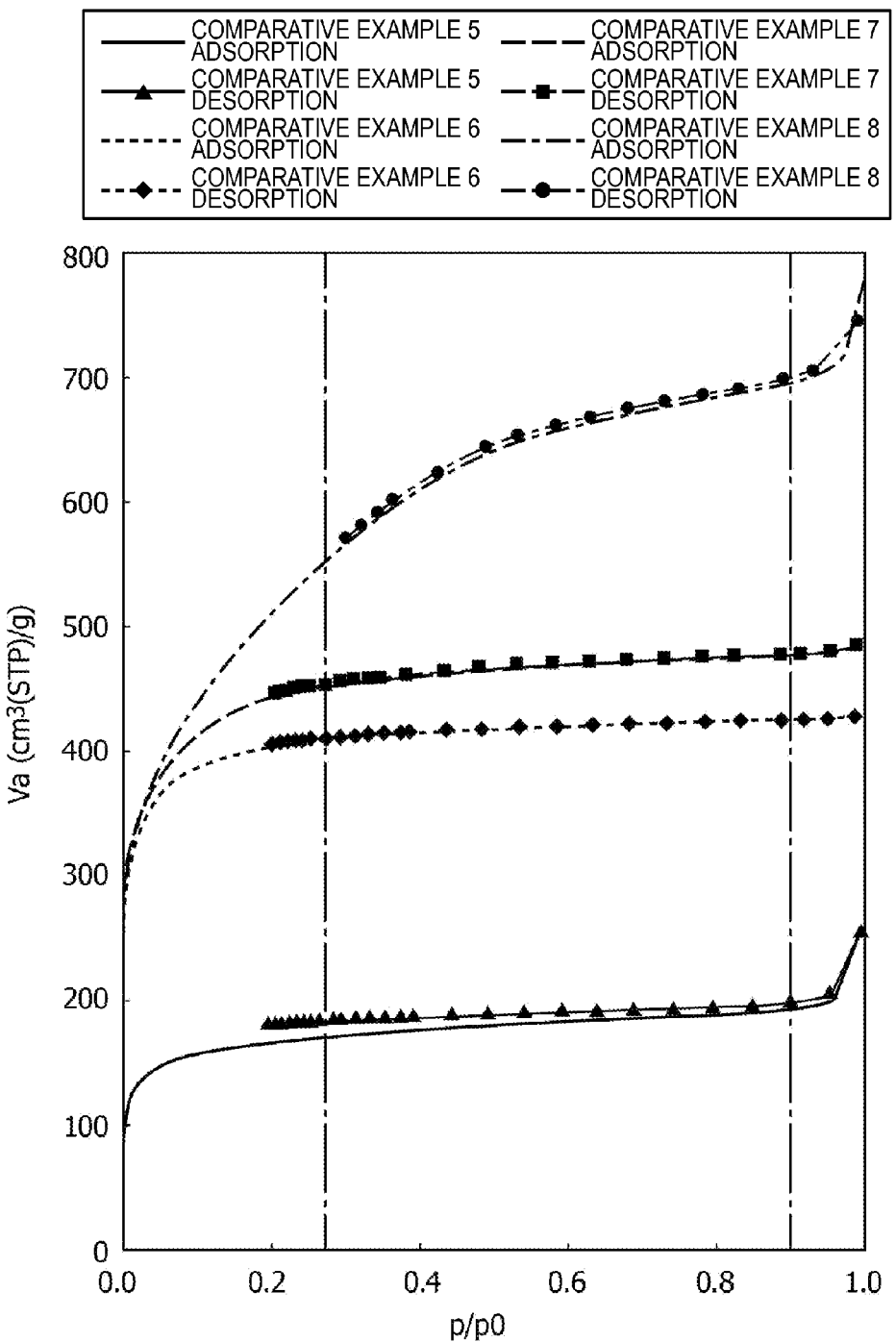
FIG. 4 shows adsorption isotherms and desorption isotherms curves prepared by measuring for the activated carbons of Comparative Example 5-1 to Comparative Example 8-1.

Hereinafter, embodiments of the present invention will be described. However, the present invention is not limited to the embodiments described hereinafter.

First, in the present invention, a method for manufacturing activated carbon for use in an electric double-layer capacitor electrode will be described. The method for manufacturing the activated carbon for use in the electric double-layer capacitor electrode comprises a grinding step, a mixing step, and an activation treatment step.

The grinding step is a step of grinding a carbon raw material to adjust an average particle diameter of the carbon raw material into a range of 1 μm to 15 μm. The average particle diameter of the carbon raw material is beforehand adjusted, so that an activation treatment can uniformly be performed. When the average particle diameter of the carbon raw material is smaller than 1 μm, particle diameters due to fusion among particles is unfavorably increased. In addition, when the average particle diameter is larger than 15 μm, an electrode sheet having a uniform thickness cannot be obtained in manufacturing of the electrode sheet. A uniform sheet having a thickness of 200 μm or less can be manufactured by adjusting the average particle diameter of the carbon raw material into a range of 1 μm to 15 μm.

The average particle diameter can be adjusted by a usual method, including grinding with a disc mill or a bead mill as well as grinding with a jet mill, a ball mill or a high pressure grinding roll.

The mixing step is a step of mixing the carbon raw material whose average particle diameter has been adjusted, with an alkali activator to obtain a mixture. Examples of the suitable alkali activator include hydroxides such as potassium hydroxide and sodium hydroxide and carbonates such as sodium carbonate and potassium carbonate. The alkali activator may be used alone or a mixture of two or more thereof. Of these examples, the hydroxides are preferable, and potassium hydroxide or sodium hydroxide is more preferable.

When the alkali activator is mixed with a carbon raw material, the alkali activator is added as a powder material. The carbon raw material can be mixed with the alkali activator by a usual method, and it is possible to mix them mechanically, for example, with the ball mill or Henschel mixer, or to mix the carbon raw material with the alkali activator of a molten state. A weight ratio of the carbon raw material to the alkali activator can be from 1.0:1.7 to 1.0:5.0 and is preferably from 1.0:2.0 to 1.0:4.0. An especially preferable method is a method comprising the steps of: blending the alkali activator with the carbon raw material and then grinding the mixture with a hammer mill.

The activation treatment step is a step of heating the mixture of the carbon raw material and the alkali activator under an atmosphere of an inert gas. The activation treatment step comprises a stage of an activation treatment under the atmosphere of a mixed gas of the inert gas and water vapor. An activation treatment is a treatment of generating a large number of pores which are suitable for adsorption in the surface of the carbon raw material. According to such an activation treatment, activated carbon excellent in adsorption characteristics of a nitrogen gas can be produced. As a result, the electric double-layer capacitor electrode having high rate characteristics and float characteristics can be manufactured.

The rate characteristics means easiness of charge/discharge of a battery. The capacitance maintenance rate can be calculated to evaluate the easiness of the charge/discharge. In addition, the float characteristics mean a life of the battery. The capacitance retention rate can be calculated to evaluate the life.

The inert gas is used to prevent the carbon raw material from being oxidized during the activation treatment. Examples of the inert gas suitable for the activation treatment in the present invention include the nitrogen gas, argon, and helium. When such an inert gas is used, the activated carbon excellent in adsorption characteristics of the nitrogen gas can be manufactured.

When the mixture of the carbon raw material and the alkali activator is heated, the activation treatment of the mixture proceeds. A heating temperature can be selected to be that for a known activation treatment performed in usual activated carbon production so that the activation treatment can be allowed to sufficiently proceed. For example, the heating temperature of the mixture of the carbon raw material and the alkali activator can be selected to be a high temperature of preferably 500° C. or more, more preferably 600° C. or more, and further preferably 700° C. or more. There is not any special restriction on an upper limit of the temperature. When the upper limit is 900° C. or less, the activation treatment proceeds without any difficulty.

The activation treatment in the present invention comprises the stage of the activation treatment under the atmosphere of the inert gas and the water vapor. Consequently, the obtained carbon material can have suitable numerical ranges of a ratio of a nitrogen gas adsorption amount, an area value of hysteresis generated by a difference between a nitrogen gas adsorption isotherm and a nitrogen gas desorption isotherm and a specific surface area. Such a carbon material can provide excellent characteristics for the electric double-layer capacitor electrode. A ratio of the water vapor to be mixed into the inert gas can be, e.g., from 0.1 g to 1.5 g of $H_2O$ relative to 1 L of the inert gas.

In the activation treatment step in the present invention, the mixture of the carbon material and the alkali activator can be treated with any equipment as long as the equipment can hermetically be closed and can heat the mixture under the inert atmosphere. The activation treatment can be carried out, for example, in a tubular furnace comprising a heater.

In the activation treatment step comprised by the method for manufacturing the activated carbon for the electric double-layer capacitor electrode of the present invention, the heating of the mixture of the carbon raw material and the alkali activator can comprise subjecting the mixture to temperature increase to the temperature in a range of 700° C. to 900° C. and then keeping the mixture at the temperature. In the step of mixing the carbon material and the alkali activator, it is necessary to mix them sufficiently for the uniform activation treatment. This mixing step is preferably performed at room temperature at which activity of the alkali activator is low to avoid starting of the activation treatment. On the other hand, the activity of the alkali activator heightens in a high temperature region of about 700° C. to 900° C. Therefore, there is provided the temperature increasing stage of increasing the temperature of the mixture mixed at room temperature to such a temperature that the activity of the alkali activator heightens, so that the mixing step and the activation treatment step can smoothly be performed.

A temperature increasing condition at the temperature increasing stage can be set to a usual condition for use in the activation treatment, and any problem does not occur in the activation treatment as long as the condition is in a range of 1° C./minute to 50° C./minute. The temperature increasing condition can be from 5° C./minute to 30° C./minute, from the stand point of an efficiency of the activation treatment, a load to be applied to the equipment for use in the activation treatment and the like.

The temperature of the mixture is increased to the high temperature region of about 700° C. to 900° C., in which the mixture is kept preferably for about ten minutes to two hours, more preferably for 30 minutes to one hour, whereby the activation treatment sufficiently proceeds.

In the method for manufacturing the activated carbon for the electric double-layer capacitor electrode of the present invention, the temperature of the mixture of the carbon raw material and the alkali activator during introduction of the water vapor is preferably from 500° C. to 900° C. It is considered that the alkali activator starts a reaction such as a dehydration reaction, or an aqueous gas reaction with carbon at 400° C. to 500° C. or less to form pores. When water (the water vapor) is also present at this time, the water preferentially reacts with the alkali activator, and hence, the activation of the carbon raw material is disadvantageously hindered, thereby decreasing the specific surface area of the activated carbon. When the reaction in which the alkali activator forms the pores in the carbon raw material proceeds to a certain degree and then the water (the water vapor) is mixed therein, the hindrance of the activation of the carbon raw material is alleviated. Therefore, when the water (the water vapor) is introduced into the mixture at a temperature of 500° C. to 900° C., it is possible to obtain the carbon material having not only the specific surface area but also the ratio of the nitrogen gas adsorption amounts and the area value of the hysteresis generated by the difference between the nitrogen gas adsorption isotherm and the nitrogen gas desorption isotherm falling in more preferable numerical ranges. It is to be noted that, when the temperature of the mixture is more than 900° C., pores may be lost due to shrinkage of the carbon raw material and the specific surface area may become smaller.

When the water vapor is introduced into the mixture of the carbon raw material and the alkali activator is at the temperature of from 500° C. to 900° C., the water vapor can be introduced at the temperature increasing stage, or at the temperature keeping stage. The above introduction of the water vapor can appropriately be ended, or the water vapor can continuously be introduced until the activation treatment ends.

In the method for manufacturing the activated carbon for the electric double-layer capacitor electrode of the present invention, the carbon raw material is preferably a graphitizable carbon material. As the carbon raw material, there can be utilized the mineral-based raw material including a coal such as peat, grass peat, lignite, brown coal, bituminous coal or anthracite; coal tar; petroleum or coal pitch; and coke. A pitch may be an isotropic pitch or an anisotropic pitch (e.g. a mesophase pitch). The carbon raw material can be used alone or in the combination of two or more thereof. In the present invention, the above graphitizable carbon material is the carbon raw material which is easily graphitized, and examples of the graphitizable carbon material include petroleum coke and coal coke listed as the above carbon raw materials, and infusibilized or carbonized mesophase pitch or spun mesophase pitch fiber. Among these examples, the petroleum coke is preferable. The above graphitizable carbon material enhances an effect of the water vapor introduction at the time of alkali activation.

The petroleum coke is a product containing, as a main component, solid carbon obtainable by thermally decomposing (coking) a heavy fraction of petroleum at a high temperature of about 500° C., and called the petroleum coke in contrast to usual coal coke. The petroleum coke includes coke obtained by a delayed coking method and the coke obtained by a fluid coking method. At present, the coke obtained by the delayed coking method has occupied a major part of the petroleum coke. In the present invention, it is preferable to use the petroleum coke as it is (hereinafter also referred to as the raw coke) after taken out of a coker. The raw coke produced by the delayed coking method has volatile content of usually from 6 mass % to 13 mass %. The raw coke produced by the fluid coking method has volatile content of usually from 4 mass % to 7 mass %. In the present invention, the raw coke produced by any one of the methods may be used. The raw coke produced by the delayed coking method is especially suitable because it is easily available and has a stable product quality.

There is not any special restriction on the above heavy fraction of the petroleum. Examples of the heavy fraction include heavy oil obtained as residue oil when petroleum is distilled under reduced pressure, heavy oil obtained when petroleum is subjected to fluid catalytic cracking, heavy oil obtained when petroleum is hydrodesulfurized, and a mixture of them.

In the method for manufacturing the activated carbon for the electric double-layer capacitor electrode of the present invention, the carbon raw material is not limited to a raw material obtained by a sintering treatment of the graphitizable carbon material, but when the sintering treatment is performed, the following method is carried out.

The sintering treatment of the graphitizable carbon material is carried out in a temperature range of preferably 500° C. to 900° C., more preferably 500° C. to 800° C. in the inert gas. In this case, there is not any special restriction on a temperature increasing speed, but when the speed is excessively slow, the treatment step requires much time, and contrarily, when the temperature excessively rapidly increases, the volatile content is explosively volatilized so that a crystal structure may be broken. In consideration of these respects, the temperature increasing speed is usually preferably from about 30° C./hour to 600° C./hour, more preferably from about 60° C./hour to 300° C./hour. After a desired sintering temperature is reached, the temperature is preferably kept constant for a certain time. The temperature keeping time is, for example, from about ten minutes to two hours.

Next, the activated carbon for the electric double-layer capacitor electrode of the present invention will be described. In the activated carbon for the electric double-layer capacitor electrode of the present invention, a ratio α of the adsorption amounts which is obtained from the nitrogen gas adsorption amounts is $0.10 \leq \alpha \leq 0.22$, an area β of adsorption/desorption hysteresis is 1.5 cm$^3$ (STP)/g$\leq \beta \leq$5.0 cm$^3$ (STP)/g, and the specific surface area by a BET method is from 1500 m$^2$/g to 2300 m$^2$/g. Here, STP is abbreviation for standard temperature and pressure.

According to the present application, in the activated carbon, α is the ratio of the adsorption amounts which is represented by the following equation (1). In the equation, in the nitrogen gas adsorption isotherm obtained by nitrogen gas adsorption at a liquid nitrogen temperature, Va (0.01) represents the nitrogen gas adsorption amount of a relative pressure (p/p$_0$) of 0.01, Va (0.273) represents the nitrogen gas adsorption amount at a relative pressure (p/p$_0$) of 0.273, and Va (0.385) represents the nitrogen gas adsorption amount at a relative pressure (p/p$_0$) of 0.385. In the relative pressure (p/p$_0$), p represents an adsorption equilibrium pressure, and p$_0$ represents a saturated vapor pressure. In addition, p/p$_0$=0.01 when a pore diameter (dp) in MP (Micropore) method analysis is 0.6 nm, and p/p$_0$=0.273 when dp is 1.0 nm. Further, p/p$_0$=0.385 indicates a minimum value (2.4 nm) of dp in BJH (Barrett-Joyner-Halenda) method analysis.

[Equation 2]

$$\alpha = (Va(0.385) - Va(0.273))/(Va(0.273) - Va(0.01)) \quad (1)$$

Here, an MP method is a method in which a nitrogen adsorption isotherm is obtained from the adsorption amount at the liquid nitrogen temperature, and a micropore volume, a micropore area and a distribution of micropores are obtained by using "a t-plot method" (B. C. Lippens, J. H. de Boer, J. Catalysis, 4, 319 (1965)), and is a method contrived by M. Mikhail, Brunauer, Bodor (R. S. Mikhail, S. Brunauer, E. E. Bodor, J. Colloid Interface Sci., 26, 45 (1968)).

In addition, a BJH method is a method of supposing that mesopores are cylindrical to obtain pore diameters from an adsorption isotherm (E. P. Barrett, L. G. Joyner, P. P. Halenda: J. Amer. Chem. Soc. 73 (1951), 373).

It is considered that a value smaller than p/p$_0$=0.01 does not have any reliability in the MP method, because the adsorption amount in the adsorption isotherm rapidly increases. Therefore, in the present embodiment, it is considered that p/p$_0$=0.01 indicates a reliable measurement lower limit value of the pore diameters in the analysis by the MP method, i.e., a pore having a pore diameter of 0.6 nm is the lower limit of the pores. In addition, p/p$_0$=0.273 when the pore diameter is 1.0 nm in the MP method, and among the pores, a maximum diameter of the micropores is 2 nm, so that, as an intermediate point of the pore size, the pore having a pore diameter of 1.0 nm is used as a criterion. Furthermore, p/p$_0$=0.385 indicates the minimum value (2.4 nm) of the pore diameters which can be analyzed in the BJH method analysis. It is considered that a value smaller than this minimum value does not have any reliability in the BJH method.

The ratio α of the adsorption amounts is obtained by dividing a total adsorption amount of the nitrogen gas which is adsorbed to the pores having the pore diameters of 1.0 nm to 2.4 nm by a total adsorption amount of the nitrogen gas which is adsorbed to the pores having pore diameters of 0.6 nm to 1.0 nm. In the activated carbon in which α satisfies $0.10 \leq \alpha \leq 0.22$, i.e. in the activated carbon having both of the pores having the pore diameters of 0.6 nm to 1.0 nm and the pores having the pore diameters of 1.0 nm to 2.4 nm, the total adsorption amount of the pores of 0.6 nm to 1.0 nm is from ten times to 30 times as large as the total adsorption amount of the pores of 1.0 nm to 2.4 nm.

The activated carbon having α of smaller than 0.10 or the activated carbon having α of larger than 0.22 is inferior in adsorption characteristics of the nitrogen gas, so that, the electric double-layer capacitor electrode comprising the activated carbon cannot have the excellent rate characteristics and float characteristics. The activated carbon in which α satisfies $0.10 \leq \alpha \leq 0.22$ is excellent in adsorption characteristics of the nitrogen gas, and as a result, the electric double-layer capacitor electrode comprising the activated carbon can have the excellent rate characteristics and float characteristics.

According to the present invention, the activated carbon, the area β of the adsorption/desorption hysteresis is obtained by a difference between an adsorption amount indicated by the nitrogen gas adsorption isotherm and a desorption amount indicated by the nitrogen gas desorption isotherm in the relative pressure of $0.273 \leq p/p_0 \leq 0.900$. In a case where histories of the adsorption isotherm and desorption isotherm are defined as hysteresis, in the activated carbon of the present invention, the history of the adsorption isotherm does not match that of the desorption isotherm, i.e., a process of the adsorption of the nitrogen gas does not match that of the desorption. In the present invention, a region surrounded by the adsorption isotherm and the desorption isotherm at the relative pressure of $0.273 \leq p/p_0 \leq 0.900$, p/p$_0$=0.273 and p/p$_0$=0.900 is defined as the adsorption/desorption hysteresis. In the present invention, the area of the adsorption/desorption hysteresis is 1.5 cm$^3$ (STP)/g≤β≤5.0 cm$^3$ (STP)/g. Here, $p/p_0$=0.900, when the pore diameter is 20 nm in the BJH method, and among the pores, the region of the mesopores is from 2 nm to 50 nm, so that, the intermediate pore, i.e., the pore having the pore diameter of 20 nm is used as the criterion of an upper limit of the pores.

The activated carbon having β of smaller than 1.5 cm$^3$ (STP)/g or the activated carbon having β of larger than 5.0 cm$^3$ (STP)/g is inferior in adsorption characteristics of the nitrogen gas, so that, the electric double-layer capacitor electrode comprising the activated carbon cannot have the excellent rate characteristics and float characteristics. The activated carbon in which β satisfies 1.5 cm$^3$ (STP)/g≤β≤5.0 cm$^3$ (STP)/g is excellent in adsorption characteristics of the nitrogen gas, and as a result, the electric double-layer capacitor electrode comprising the activated carbon can have the excellent rate characteristics and float characteristics.

According to the present application, the activated carbon has the specific surface area by the BET method of from 1500 m$^2$/g to 2300 m$^2$/g. The activated carbon having the specific surface area of smaller than 1500 m$^2$/g or the activated carbon having the specific surface area of larger than 2300 m$^2$/g is inferior in adsorption characteristics of the nitrogen gas, so that, the electric double-layer capacitor electrode comprising the activated carbon cannot have the excellent rate characteristics and float characteristics. The activated carbon having the specific surface area of from 1500 m$^2$/g to 2300 m$^2$/g is excellent in adsorption characteristics of the nitrogen gas, and as a result, the electric double-layer capacitor electrode comprising the activated carbon can have the excellent rate characteristics and float characteristics.

Next, an electric double-layer capacitor will be described. The electric double-layer capacitor comprises, for example, electrodes, each comprising the carbon material for the electric double-layer capacitor electrode of the present invention. This electrode comprises, for example, the activated carbon and a binder, and further preferably a conductive agent, and may be integrated with a current collector.

As the binder, a known binder is usable. Examples of the binder include polyolefin such as polyethylene or polypropylene; fluorinated polymer such as polytetrafluoroethylene, polyvinylidene fluoride or fluoroolefin/vinyl ether copolymer cross-linked polymer; a cellulose compound such as carboxymethyl cellulose; vinyl polymer such as polyvinyl pyrrolidone or polyvinyl alcohol; and polyacrylic acid. There is not any special restriction on the content of the binder in the electrode. The content of the binder is usually appropriately selected in a range of about 0.1 mass % to 30 mass % to a total amount of the activated carbon and the binder.

The conductive agent include a powder of carbon black, powdery graphite, titanium oxide or ruthenium oxide. An amount of the conductive agent to be blended in the electrode is appropriately selected according to a blending purpose. The amount is appropriately selected usually in a range of about 1 mass % to 50 mass %, preferably in a range of about 2 mass % to 30 mass % to a total amount of the activated carbon, the binder and the conductive agent.

As a method of mixing the activated carbon, the binder and the conductive agent, a known method can appropriately be applied. For example, there is a method comprising the steps of: adding a binder-dissolvable solvent to the activated carbon, the binder and the conductive agent to obtain a slurry and applying this slurry uniformly onto the current collector. In addition, there is a method comprising the steps of: kneading the activated carbon, the binder and the conductive agent without adding the solvent and then subjecting pressure molding at ordinary temperature or under heating.

As the current collector, a current collector made of a known material and having a known shape is usable. Examples of the current collector include a metal such as aluminum, titanium, tantalum or nickel; and an alloy such as stainless steel.

A unit cell of the electric double-layer capacitor is generally formed by using a pair of the above electrodes as a positive electrode and a negative electrode, allowing the electrodes to face each other via a separator (e.g. polypropylene fiber nonwoven cloth, glass fiber nonwoven cloth, synthetic cellulose paper) and immersing the electrodes into an electrolytic solution. As the electrolytic solution, a known aqueous electrolytic solution or an organic electrolytic solution is usable. As the electrolytic solution, the organic electrolytic solution is more preferably used. As this organic electrolytic solution, a solution for use as a solvent of an electrochemical electrolytic solution is usable. Examples of the organic electrolytic solution include propylene carbonate, ethylene carbonate, butylene carbonate, γ-butyrolactone, sulfolane, a sulfolane derivative, 3-methylsulfolane, 1,2-dimethoxyethan, acetonitrile, glutaronitrile, valeronitrile, dimethylformamide, dimethyl sulfoxide, tetrahydrofuran, dimethoxyethane, methyl formate, dimethyl carbonate, diethyl carbonate, and ethyl methyl carbonate. The electrolytic solution may be used in the combination of two or more thereof.

In addition, there is not any special restriction on a supporting electrolyte in the organic electrolytic solution. A various type of electrolyte such as a salt, acid and alkali usually for use in an electrochemical field or a battery field is usable. Examples of the supporting electrolyte include inorganic ion salts such as an alkali metal salt and an alkali earth metal salt, a quaternary ammonium salt, an annular quaternary ammonium salt, and a quaternary phosphonium salt. Preferable examples of the supporting electrode include $(C_2H_5)_4NBF_4$, $(C_2H_5)_3(CH_3)NBF_4$, $(C_2H_5)_4PBF_4$, and $(C_2H_5)_3(CH_3)PBF_4$. A concentration of the salt in the electrolytic solution is appropriately selected usually in a range of about 0.1 mol/l to 5 mol/l, preferably in a range of about 0.5 mol/l to 3 mol/l. There is not any special restriction on a more specific structure of the electric double-layer capacitor. Examples of the structure include a coin type in which a separator is interposed between a pair of thin sheet-like or disc-like electrodes (positive and negative electrodes), each having a thickness of 10 μm to 500 μm, and is housed in a metal case; a wound type in which a pair of electrodes are wound via a separator; and a laminated type in which a large number of electrode groups are laminated via separators.

EXAMPLES

Hereinafter, the present invention will further specifically be described based on examples and comparative examples. It should not be construed that the present invention is limited to or by the examples.

Manufacturing of Activated Carbon

Example 1-1

Activated carbon was manufactured using petroleum raw coke as a carbon raw material. The petroleum raw coke was adjusted to have particle sizes of 2 mm or less for the purpose of easy grinding, and then ground with a jet mill to have an average particle diameter of 8 μm (in a grinding step). The 100 parts by mass of the ground petroleum raw coke was subjected to addition of 200 parts by mass of potassium hydroxide, and mixed in a ball mill to obtain a mixture (in a mixing step). The obtained mixture was placed in a ceramic electric tubular furnace, and the tubular furnace was hermetically closed to place the inside of the furnace under a nitrogen gas atmosphere. Afterward, the mixture was heated in the tubular furnace with temperature increase of 20° C./minute to increase the temperature of the mixture from room temperature to 750° C. After the temperature of the mixture reached 750° C., the temperature was kept at 750° C. for 30 minutes, for an activation treatment (in an activation treatment step). Here, when the temperature of the mixture was increased to reach 500° C., water vapor was introduced into a nitrogen gas at a ratio of 0.5 g of water relative to 1 L of the nitrogen gas to place the mixture under a mixing atmosphere of the nitrogen gas and the water vapor. The water vapor was continuously introduced until the temperature reached 750° C. and kept at 750° C. for 30 minutes, that is, until the activation treatment ended. After the activation treatment, the mixing of the water vapor and the heating by the heater were stopped, and natural cooling was carried out under the nitrogen gas atmosphere until room temperature. The activated substance subjected to the activation treatment was cooled to room temperature and removed from the tubular furnace, and then repeatedly subjected to water washing and acid washing by hydrochloric acid water to remove remaining metal potassium, followed by drying, to obtain the activated carbon. Additionally, in the present invention, the average particle diameter was measured in a wet system by use of a laser diffraction/scattering particle diameter distribution measuring apparatus LA-950 manufactured by HORIBA, Ltd., and a median diameter was regarded as an average diameter.

Example 2-1

The same raw coke as used in Example 1-1 was sintered at 600° C. in a nitrogen gas atmosphere for one hour. A temperature increasing speed up to 600° C. was set to 200° C./hour. The obtained sintered material was ground with a jet mill to have an average particle diameter of 7 µm (in a grinding step). The 240 parts by mass of potassium hydroxide was added to 100 parts by mass of the sintered material and mixed in a ball mill to obtain a mixture (in a mixing step). The mixture was heated so that a temperature of the mixture increased up to 850° C., and the temperature was kept at 850° C. Introduction of water vapor was started when the temperature of the mixture was increased to reach 600° C. Except for the above, in the same manner as in Example 1-1, a mixing step, an activation treatment step, washing and drying were carried out to obtain activated carbon.

Example 3-1

As an alkali activator, 400 parts by mass of sodium hydroxide was used, a mixture was heated so that a temperature of the mixture increased up to 800° C., and the temperature was kept at 800° C. Introduction of water vapor was started when the temperature of the mixture was increased to reach 500° C., and the mixing was stopped when the temperature of the mixture reached 700° C. Except for the above, activated carbon was obtained using the same carbon raw material and same method as in Example 1-1.

Comparative Example 1-1

Activated carbon was obtained using the same carbon raw material and the same method as those in Example 1-1 except that water vapor was not mixed into a nitrogen gas.

Comparative Example 2-1

Activated carbon was obtained using the same carbon raw material and the same method as those in Example 2-1 except that water vapor was not mixed into a nitrogen gas.

Comparative Example 3-1

Activated carbon was obtained using the same carbon raw material and the same method as those in Example 3-1 except that water vapor was not mixed into a nitrogen gas.

Comparative Example 4-1

The activated carbon obtained by the method in Comparative Example 1-1 was placed in a tubular furnace, and this ceramic electric tubular furnace was hermetically closed to place the inside of the furnace under a nitrogen gas atmosphere. Afterward, a mixture was heated by a heater of the tubular furnace so that a temperature of the mixture increased from room temperature up to 850° C. at a temperature increase of 20° C./minute. After the temperature of the mixture reached 850° C., the temperature was then kept for 30 minutes. In this process, when the temperature of the mixture was increased to reach 150° C., the mixture was placed under a mixing atmosphere of the nitrogen gas and the water vapor by introducing water vapor into a nitrogen gas at a ratio of 0.5 g of water to 1 L of nitrogen gas. The water vapor was continuously introduced until the temperature was kept at 850° C. for 30 minutes. Afterward, the introduction of the water vapor and the heating by the heater were stopped, and natural cooling was carried out down to room temperature under the nitrogen gas atmosphere. As described above, the activated carbon obtained by the method in Comparative Example 1-1 was further subjected to a water vapor treatment to obtain the activated carbon.

Comparative Example 5-1

Petroleum raw coke was obtained by the same grinding step as in Example 1-1. The obtained petroleum raw coke was subjected to a water vapor treatment at 800° C. for two hours in the same manner as that for the activated carbon in Comparative Example 4-1. A BET specific surface area of the water vapor-treated coke was 30 m$^2$/g. The 240 parts by mass of potassium hydroxide was added relative to 100 parts by mass of the water vapor-treated coke and mixed in a ball mill to obtain a mixture. The obtained mixture was placed in a ceramic electric tubular furnace, and the tubular furnace was hermetically closed to place the inside of the furnace under a nitrogen gas atmosphere. Afterward, the mixture was heated by a heater of the tubular furnace so that a temperature of the mixture increased from room temperature up to 750° C. at a temperature increase of 20° C./minute. After the temperature of the mixture reached 750° C., the temperature was then kept for 30 minutes for the activation treatment. Water vapor was not introduced. After the activation treatment, the heating by the heater was stopped, and natural cooling was carried out down to room temperature under the nitrogen gas atmosphere. After the cooling down to room temperature, an activated product subjected to the activation treatment was removed from the tubular furnace, and repeatedly subjected to water washing and acid washing by hydrochloric acid water to remove remaining metal potassium, followed by drying to obtain the activated carbon. As described above, the petroleum raw coke was first subjected to a water vapor treatment, and then mixed with an alkali activator to perform an alkali activation treatment to obtain the activated carbon.

Comparative Example 6-1

A carbon raw material same as in Example 1-1 was used to obtain an activated carbon in the same manner as in Example 1-1 except for introduction of water vapor when a temperature of a mixture reached 400° C.

Comparative Example 7-1

Activated carbon was obtained in the same manner as in Example 1-1 except for use of 160 parts by mass of potassium hydroxide relative to 100 parts by mass of petroleum raw coke in a mixing step.

Comparative Example 8-1

Activated carbon was obtained in the same manner as in Example 1-1 except for use of 540 parts by mass of potassium hydroxide relative to 100 parts by mass of petroleum coke in a mixing step.

Comparative Example 9-1

A mixture of 440 parts by mass of sodium hydroxide and 100 parts by mass of the substance obtained by grinding of the same sintered substance obtained as in Example 2-1 was subjected to an activation treatment in the absence of water vapor in the same manner as in Comparative Example 3-1 to obtain activated carbon.

Comparative Example 10-1

Activated carbon was obtained in the same manner as in Example 1-1, except that 280 parts by mass of potassium hydroxide to 100 parts by mass petroleum coke in a mixing step was used, and the mixing atmosphere of a nitrogen gas and water vapor was maintained until a temperature of the activated carbon reached 500° C. by natural cooling after the activation treatment.

As to the obtained activated carbon, an adsorption isotherm and a desorption isotherm were prepared by a method of measuring a nitrogen gas adsorption amount and a desorption amount at a liquid nitrogen temperature by use of a gas adsorption apparatus (BELSORPmini manufactured by BEL JAPAN, INC.), and a ratio (a) of the adsorption amounts and an adsorption/desorption hysteresis area ($\beta$) were calculated. In addition, a specific surface area of each activated carbon was measured by a nitrogen gas adsorption method (BET method). A total pore volume was calculated from the adsorption amount of an adsorption final point, and a BJH specific surface area was obtained from pore volumes and pore diameters obtained in a process of obtaining a BJH method pore distribution. The result is shown in FIG. 1 to FIG. 5, Table 1 and Table 2.

TABLE 1

| | Item | Example 1-1 | Example 2-1 | Example 3-1 |
|---|---|---|---|---|
| Sintering of carbon raw material | | Not sintered | 600° C. 1 hr | Not sintered |
| Particle size adjustment | Ave. particle dia. (μm) | 8 | 7 | 8 |
| Mixing | Alkali activator | KOH | KOH | NaOH |
| | Mixture ratio of activator/carbon raw material (g/g) | 2.0 | 2.4 | 4.0 |
| Activation | Activation temp. (° C.) | 750 | 850 | 800 |
| | Water vapor introduction temp. (° C.) | 500~750 | 600~850 | 500~700 |
| Physical properties of activated carbon | BET specific surface area (m²/g) | 1830 | 1584 | 1590 |
| | Total pore volume (cm³/g) | 1.070 | 0.846 | 0.843 |
| | BJH specific surface area (m²/g) | 555 | 315 | 378 |
| | Ratio of adsorption amounts ($\alpha$) | 0.17 | 0.11 | 0.13 |
| | Adsorption/desorption hysteresis area ($\beta$)(cm³(STP)/g) | 4.8 | 4.5 | 4.3 |

TABLE 2

| | Item | Comparative Example 1-1 | Comparative Example 2-1 | Comparative Example 3-1 | Comparative Example 4-1 | Comparative Example 5-1 | Comparative Example 6-1 |
|---|---|---|---|---|---|---|---|
| Sintering of carbon raw material | | Not sintered | 600° C. 1 hr | Not sintered | Activated carbon obtained in Comparative Example 1 | The same raw material as in Example 1 that was subjected to water vapor treatment | Not sintered |
| Particle size adjustment | Ave. particle dia. (μm) | 8 | 7 | 8 | | | 8 |
| Mixing | Alkali activator | KOH | KOH | NaOH | | KOH | KOH |
| | mixture ratio of activator/carbon raw material (g/g) | 2.0 | 2.4 | 4.0 | | 2.4 | 2.0 |
| Activation | Activation temp. (° C.) | 750 | 850 | 800 | 850 | 750 | 750 |
| | Water vapor mixing temp. (° C.) | Not introduced | Not introduced | Not introduced | 150~850 | Not introduced | 400~750 |
| Physical properties of activated carbon | BET specific surface area (m²/g) | 2150 | 1988 | 1645 | 1698 | 607 | 1481 |
| | Total pore volume (cm³/g) | 1.047 | 0.906 | 0.768 | 0.820 | 0.389 | 0.664 |
| | BJH specific surface area (m²/g) | 356 | 200 | 175 | 249 | 87 | 93 |

TABLE 2-continued

| | | | | | | |
|---|---|---|---|---|---|---|
| Ratio of adsorption amounts (α) | 0.07 | 0.05 | 0.05 | 0.06 | 0.10 | 0.05 |
| Adsorption/desorption hysteresis area (β) (cm³ (STP)/g) | 0.8 | 1.2 | 0.7 | 0.5 | 4.7 | 0.6 |

| | Item | Comparative Example 7-1 | Comparative Example 8-1 | Comparative Example 9-1 | Comparative Example 10-1 |
|---|---|---|---|---|---|
| | Sintering of carbon raw material | Not sintered | Not sintered | 600° C. 1 hr | Not sintered |
| Particle size adjustment | Ave. particle dia. (μm) | 8 | 8 | 7 | 8 |
| Mixing | Alkali activator | KOH | KOH | NaOH | KOH |
| | mixture ratio of activator/carbon raw material (g/g) | 1.6 | 5.4 | 4.4 | 2.8 |
| Activation | Activation temp. (° C.) | 750 | 750 | 800 | 750 |
| | Water vapor mixing temp. (° C.) | 500~750 | 500~750 | Not introduced | 500~750~500 |
| Physical properties of activated carbon | BET specific surface area (m²/g) | 1606 | 1778 | 1732 | 1637 |
| | Total pore volume (cm³/g) | 0.752 | 1.060 | 0.781 | 0.930 |
| | BJH specific surface area (m²/g) | 155 | 717 | 126 | 353 |
| | Ratio of adsorption amounts (α) | 0.06 | 0.23 | 0.10 | 0.11 |
| | Adsorption/desorption hysteresis area (β) (cm³ (STP)/g) | 2.5 | 2.8 | 1.0 | 10.9 |

FIG. 1 illustrates an adsorption isotherm curve prepared by measuring for the activated carbon of Example 1-1. From this adsorption isotherm, when the values of relative pressure ($p/p_0$) were 0.01, 0.273 and 0.385, nitrogen gas adsorption amounts Va (0.01), Va (0.273) and Va (0.385) were obtained, and a ratio (a) of the adsorption amounts in the activated carbon of Example 1-1 was calculated by the following equation (1). Also as to the activated carbons of Example 2-1 to Comparative Example 10-1, the values of the ratio (a) of the adsorption amounts were similarly calculated (see Table 1 and Table 2).

[Equation 3]

$$\alpha = (Va(0.385) - Va(0.273))/(Va(0.273) - Va(0.01)) \quad (1)$$

FIG. 2 illustrates adsorption isotherms and desorption isotherms curves prepared by measuring for the activated carbons of Example 1-1 to Example 3-1. From FIG. 2, as to each of the activated carbons of Example 1-1 to Example 3-1, there was calculated an area (β) of a region surrounded by the adsorption isotherm and the desorption isotherm in a relative pressure of $0.273 \leq p/p_0 \leq 0.900$, $p/p_0 = 0.273$ and $p/p_0 = 0.900$ (see Table 1).

Figure 5:
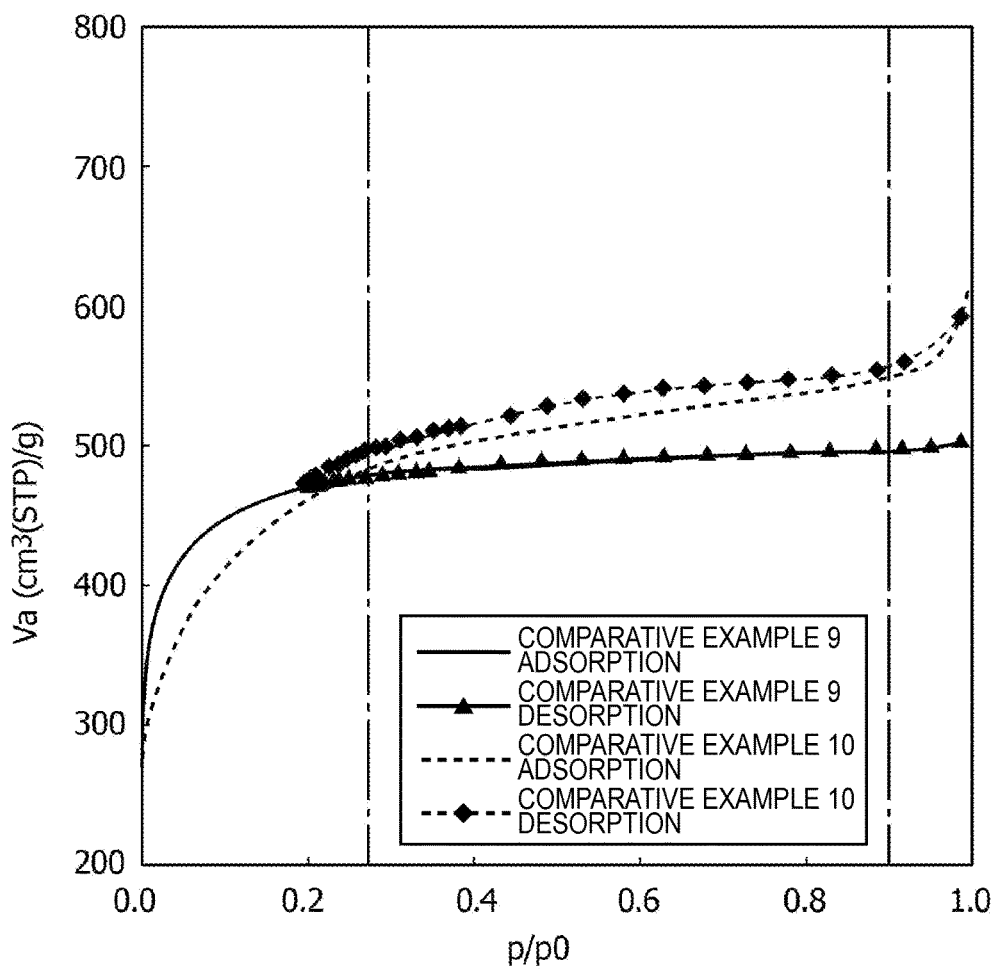
FIG. 5 shows adsorption isotherms and desorption isotherms curves prepared by measuring for the activated carbons of Comparative Example 9-1 to Comparative Example 10-1.

FIG. 3 to FIG. 5 illustrate adsorption isotherms and desorption isotherms curves prepared by measuring for the activated carbons of Comparative Example 1-1 to Comparative Example 10-1. In the same manner as in the activated carbons of Example 1-1 to Example 3-1, from FIG. 3 to FIG. 5, an adsorption/desorption hysteresis area (β) was calculated as to each of the activated carbons of Comparative Example 1-1 to Comparative Example 10-1 (see Table 2).

Table 1 and Table 2 show, as manufacturing conditions of each activated carbon, sintering conditions of a carbon raw material, an average particle diameter of the carbon raw material prior to an activation treatment, a type of alkali activator, a mixture ratio of the alkali activator to the carbon raw material, an activation temperature and a temperature of a mixture at which water vapor was introduced. In addition, each of the tables shows a BET method specific surface area of the manufactured activated carbon, a total pore volume, a BJH specific surface area, a ratio (a) of the adsorption amounts, and an adsorption/desorption hysteresis area (p).

When a mixture ratio of the activator to the carbon raw material was from 1.0:2.0 to 1.0:4.0 and the water vapor was mixed into the nitrogen gas at the temperature of 500° C. or more of the mixture during an activation reaction, there was found the tendency that the ratio (a) of the adsorption amounts of the activated carbon increased and the adsorption/desorption hysteresis area (β) became larger (Example 1-1 to Example 3-1, Comparative Example 1-1 to Comparative Example 3-1, and Comparative Example 6-1).

As to the activated carbon obtained by the method in Comparative Example 1-1, even when the water vapor treatment was further performed, the ratio of the adsorption amounts and the adsorption/desorption hysteresis area did not become larger (Comparative Example 4-1). In addition, when the carbon raw material was beforehand subjected to the water vapor treatment and then the activation treatment was performed without mixing any water vapor, there was found the tendency that the BET specific surface area became smaller (Comparative Example 5-1).

When the mixture ratio of the activator to the carbon raw material was 1.0:1.6, the ratio of the adsorption amount did not become larger even when the water vapor was mixed (Comparative Example 7-1). On the other hand, when the mixture ratio of the activator to the carbon raw material was 1.0:5.4, the result showed that the ratio of the adsorption amount became excessively large (Comparative Example 8-1). Additionally, when the mixture ratio of the activator to the carbon raw material was 1.0:4.4, the adsorption/desorption hysteresis area did not become larger (Comparative Example 9-1).

When the introduction of the water vapor was continued until the temperature of the activated carbon lowered to 500° C. even after the end of the activation treatment, the result showed that the adsorption/desorption hysteresis area became excessively large (Comparative Example 10-1).

[Preparation of Laminate Cell]

Figure 6:
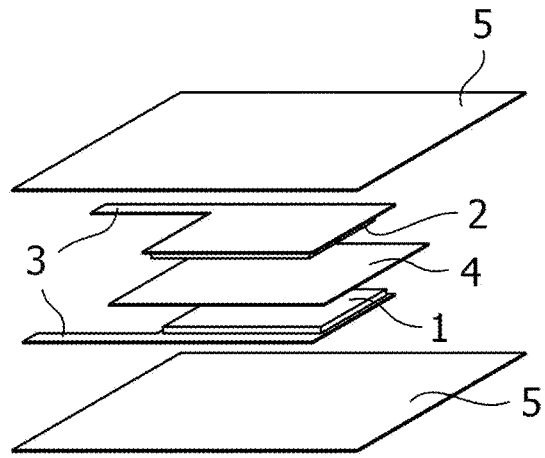
FIG. 6 is a perspective view to explain a structure of a laminate cell.

To evaluate a capacitor performance, a laminate cell was prepared by using the activated carbon prepared in each of Examples and Comparative Examples. The 1.5 g of the activated carbon was mixed with 0.13 g of carbon black (ECP600JD manufactured by Lion Corporation) and 0.11 g of granular polytetrafluoroethylene (PTFE) and the resulting mixture was pressed into a sheet with a roll presser to form a carbon electrode sheet having a thickness of 150 μm to 200 μm was prepared. The laminate cell was prepared by cutting out this carbon electrode sheet into electrodes, each having a vertical size of 1.4 cm and a lateral size of 2.0 cm, attaching current collectors 3 to the electrodes to form a positive electrode 1 and a negative electrode 2, interposing a separator 4 between the positive electrode 1 and the negative electrode 2, and covering the outer sides of the current collectors 3 with laminate films 5 as shown in FIG. 6. At this time, the positive electrode and the negative electrode were not distinguished.

[Evaluation of Capacitor Performance]

Figure 7:
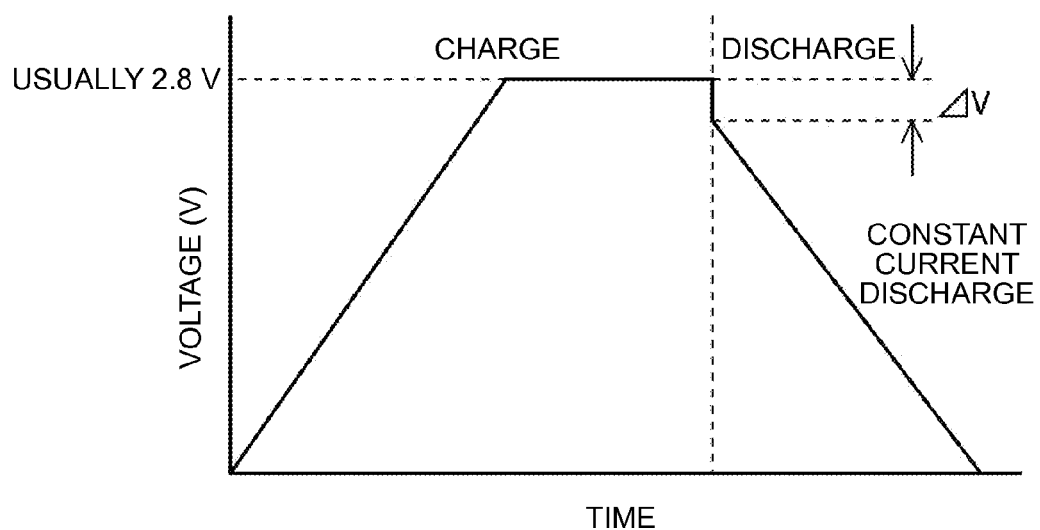
FIG. 7 shows a relationship between charge and discharge of the laminate cell.

To evaluate the capacitor performance of the laminate cell, a propylene carbonate (PC) solution of triethyl methyl ammonium tetrafluoroborate (TEMA·BF$_4$) of 1.5 M was used as an electrolytic solution, and an electrode density, a capacitance, an internal resistance, rate characteristics and float characteristics were measured. The electrode density was obtained by measuring sheet weight and volume of a vertical dimension×a lateral dimension×a thickness. The capacitance (C) was obtained from a value obtained by measuring a total discharge energy amount (U) stored in the capacitor, by an energy converting method. In addition, the internal resistance (R) was calculated from an IR drop immediately after the start of the discharge. As calculating equations of the capacitance and internal resistance, Equation (2) and Equation (3) are shown as follows. In addition, as to a relation between the charge and the discharge, FIG. 7 shows a graph in which the ordinate axis indicates a voltage (V) and the abscissa axis indicates time (S).

[Equation 4]

$$\text{Capacitance: } C = 2U/Vc^2 \quad (2)$$

$$Vc = Vm - \Delta V$$

U: total discharge energy (an integrated value under a discharge curve from full charge Vm to 0 V)

Vc: an actual voltage obtained by subtracting a voltage effect-derived voltage due to the internal resistance from a full charge voltage

[Equation 5]

$$R(\Omega) = \Delta V/I \quad (3)$$

I: discharge current (A)

The rate characteristics were obtained by measuring a capacitance when a constant current discharge value at 20° C. was varied from 0.36 mA/cm$^2$ to 72 mA/cm$^2$, and calculated as a capacitance maintenance rate during constant current discharge of 72 mA/cm$^2$ on basis of the capacitance per volume during the constant current discharge of 0.36 mA/cm$^2$. In addition, the float characteristics were measured (measurement conditions: during the discharge of 36 mA/cm$^2$ at 20° C.) as a capacitance retention rate per unit weight after retention at 2.8 V and 60° C. for 500 hours. Table 3 and Table 4 show the results.

TABLE 3

| Item | Example 1-2 | Example 2-2 | Example 3-2 |
|---|---|---|---|
| Electrode density (g/cm$^3$) | 0.488 | 0.545 | 0.574 |
| Capacitance per unit mass (F/g) | 46.9 | 44.1 | 45.0 |
| Capacitance per unit volume (F/cm$^3$) | 22.8 | 24.0 | 25.8 |
| Internal resistance (Ω) | 2.1 | 2.3 | 2.6 |
| Rate characteristics *[1]) (%) | 73 | 73 | 71 |
| Float characteristics *[2]) (%) | 68 | 65 | 65 |

TABLE 4

| Item | Comparative Example 1-2 | Comparative Example 2-2 | Comparative Example 3-2 | Comparative Example 4-2 | Comparative Example 5-2 | Comparative Example 6-2 | Comparative Example 7-2 | Comparative Example 8-2 | Comparative Example 9-2 | Comparative Example 10-2 |
|---|---|---|---|---|---|---|---|---|---|---|
| Electrode density (g/cm$^3$) | 0.533 | 0.550 | 0.546 | 0.562 | 0.683 | 0.630 | 0.545 | 0.490 | 0.542 | 0.569 |
| Capacitance per unit mass (F/g) | 46.5 | 46.0 | 44.4 | 40.6 | 28.8 | 43.8 | 44.2 | 46.1 | 45.3 | 45.0 |
| Capacitance per unit volume (F/cm$^3$) | 24.5 | 25.3 | 24.1 | 22.8 | 19.7 | 27.6 | 24.1 | 22.6 | 24.6 | 25.6 |
| Internal resistance (Ω) | 2.7 | 2.7 | 2.7 | 2.7 | 2.6 | 2.2 | 2.7 | 2.3 | 2.6 | 2.7 |
| Rate characteristics*[1]) (%) | 63 | 63 | 63 | 62 | 68 | 64 | 63 | 68 | 63 | 71 |
| Float characteristics*[2]) (%) | 58 | 52 | 57 | 58 | 59 | 60 | 52 | 60 | 59 | 58 |

Table 3 and Table 4 show the electrode density, the capacitance, the internal resistance, the rate characteristics and the float characteristics as the capacitor performances. The results of Example 1-2 shows the capacitor performance of the laminate cell manufactured by using the activated carbon of Example 1-1. The results of Example 2-2 to Comparative Example 10-2 similarly show the capacitor performances of the laminate cells manufactured by using the activated carbons of Example 2-1 to Comparative Example 10-1, respectively.

It is evident from the results that the rate characteristics and float characteristics of the laminate cells in Example 1-2 to Example 3-2 were larger than those of the laminate cells in Comparative Example 1-2 to Example 3-2, thereby exhibiting an effect of mixing the water vapor.

The rate characteristics and float characteristics of the laminate cells had smaller values in Comparative Example 4-2 to Comparative Example 9-2 as compared with those of the laminate cells in Example 1-2 to Example 3-2.

The laminate cell in Comparative Example 10-2 had the rate characteristics equivalent to those in Examples, but poor float characteristics.

It is clear from the above results that the electric double-layer capacitor electrode excellent in rate characteristics and float characteristics can be provided by using, as an electrode material, the activated carbon of the present invention which satisfies $0.10 \leq \alpha \leq 0.22$ and $1.5$ cm$^3$ (STP)/g$\leq \beta \leq 5.0$ cm$^3$ (STP)/g and in which the specific surface area by the BET method is in a range of 1500 m$^2$/g to 2300 m$^2$/g.

INDUSTRIAL APPLICABILITY

According to the present invention, an electric double-layer capacitor electrode excellent in rate characteristics and float characteristics can be provided, so that, the invention is industrially useful.

The invention claimed is:

1. A method for manufacturing an activated carbon for use in an electric double-layer capacitor electrode, comprising:
   mixing a carbon raw material having an average particle diameter ranging from 1 μm to 15 μm with an alkali activator to obtain a mixture;
   heating the mixture from room temperature to a final temperature ranging from 700° C. to 900° C. at a heating rate ranging from 5° C./min to 30° C./min; and
   maintaining the mixture at the final temperature for 10 minutes to 2 hours to manufacture an activated carbon, wherein the carbon raw material is mixed with the alkali activator in a weight ratio of 1.0:1.7 to 1.0:5.0, wherein the heating step comprises:
      heating the mixture under an atmosphere of an inert gas from room temperature to a first temperature below the final temperature;
      introducing water vapor under the atmosphere of the first temperature; and
      heating the mixture to the final temperature under the atmosphere in which the inert gas is mixed with the water vapor,
   wherein the water vapor is introduced into the atmosphere of the inert gas when a temperature of the mixture is 500° C. to 900° C., the water vapor is introduced at a ratio of 0.1 g to 1.5 g per one liter of the inert gas,
   wherein the manufactured activated carbon comprises characteristics of:
   a ratio α of adsorption amounts in a range of $0.10 \leq \alpha \leq 0.22$, in a nitrogen gas adsorption isotherm obtained by nitrogen gas adsorption at a liquid nitrogen temperature, the ratio α being represented by the following equation (1):

$$\alpha = (Va(0.385) - Va(0.273))/(Va(0.273) - Va(0.01)) \quad (1)$$

wherein Va (0.01) represents a nitrogen gas adsorption amount at a relative pressure (p/p$_0$) of 0.01, Va (0.273) represents a nitrogen gas adsorption amount at a relative pressure (p/p$_0$) of 0.273, and Va (0.385) represents a nitrogen gas adsorption amount at a relative pressure (p/p$_0$) of 0.385, wherein p represents an adsorption equilibrium pressure and p$_0$ represents a saturated vapor pressure;
   an area β of adsorption/desorption hysteresis in a range of 1.5 cm$^3$ (STP)/g$\leq \beta \leq 5.0$ cm$^3$ (STP)/g,
      wherein STP means standard temperature and pressure, and wherein the area is obtained by a difference between the adsorption amount indicated by a nitrogen gas adsorption isotherm and a desorption amount indicated by a nitrogen gas desorption isotherm in a range of $0.273 \leq p/p_0 \leq 0.900$; and
   a specific surface area by a BET method of from 1500 m$^2$/g to 2300 m$^2$/g.

2. The method for manufacturing the activated carbon for use in the electric double-layer capacitor electrode according to claim 1,
   sintering the carbon raw material prior to the mixing step.

* * * * *